US012811710B2

(12) United States Patent
Wang et al.

(10) Patent No.: US 12,811,710 B2
(45) Date of Patent: Nov. 24, 2026

(54) SYSTEM AND METHODS FOR EPIC ARCHITECTURE

(71) Applicant: Samsung Electronics Co., Ltd., Suwon-si (KR)

(72) Inventors: Yibing Michelle Wang, Temple City, CA (US); Radwanul Hasan Siddique, Monrovia, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 247 days.

(21) Appl. No.: 18/670,723

(22) Filed: May 21, 2024

(65) Prior Publication Data

US 2025/0141586 A1 May 1, 2025

Related U.S. Application Data

(60) Provisional application No. 63/546,164, filed on Oct. 27, 2023.

(51) Int. Cl.
*H04J 14/02* (2006.01)
*H04J 14/06* (2006.01)

(52) U.S. Cl.
CPC .......... *H04J 14/0307* (2023.08); *H04J 14/06* (2013.01)

(58) Field of Classification Search
CPC ........ H04J 14/06; H04J 14/0307; H04J 14/05; H04J 14/03; H04J 14/0287; H04J 14/0278;

(Continued)

(56) References Cited

U.S. PATENT DOCUMENTS 7,116,851 B2 * 10/2006 Welch ................ G02B 6/12004 385/37
7,385,691 B2 * 6/2008 Islam ........................ G01J 3/44 257/E31.128

(Continued)

FOREIGN PATENT DOCUMENTS

AU 2010263045 A1 * 2/2012 ......... A61N 1/36038
CA 2431340 C * 3/2007 ............ H04J 14/025

(Continued)

OTHER PUBLICATIONS

Bing Shen et al., "Increasing the density of passive photonicintegrated circuits via nanophotonic cloaking,"Nov. 9, 2016, Nature Communications,7:13126,pp. 1-6.*

(Continued)

*Primary Examiner* — Omar S Ismail
(74) *Attorney, Agent, or Firm* — Renaissance IP Law Group LLP

(57) ABSTRACT

A device includes an electronic integrated circuit, the electronic integrated circuit including an optical demultiplexer and at least one photodetector optically coupled to the optical demultiplexer. The optical demultiplexer may have at least one nanostructured layer able to receive an incoming optical signal and separate the incoming optical signal into a first separated optical signal and a second separated optical signal. The device may have a first photodetector and a second photodetector, where the first photodetector may receive the first separated optical signal and the second photodetector may receive the second separated optical signal.

20 Claims, 9 Drawing Sheets

(58) Field of Classification Search
CPC ............... H04J 14/0227; H04J 14/0221; H04J 14/0201; H04J 14/02; H04J 14/005; H04J 13/0007; H04J 13/0077; H04J 13/10; H04J 13/16; H04J 2011/0003; H04J 11/0023; H04J 11/0069; H04J 3/02; H04J 3/16; H04J 3/17; H04J 3/24; H04J 1/02; H04J 14/08; H04J 2203/0001; H04J 2211/003; H04J 2203/0003; H04J 2203/0028; H04J 2203/0046; H04J 2203/0051; H04J 2203/0057; H04J 2203/0089; H04J 2203/0073; H04J 1/04; H04J 1/06; H04J 1/08; H04J 4/005; H04J 7/02; H04J 2211/00
See application file for complete search history.

(56) References Cited

U.S. PATENT DOCUMENTS 7,672,546 B2 * 3/2010 Welch ..................... H01S 5/026 398/91
7,995,921 B2 * 8/2011 Grubb ................. H04J 14/0204 398/79
9,112,085 B2 * 8/2015 Mi ............................ C25B 1/55
9,261,635 B2 * 2/2016 Nagarajan ................ G02B 5/30
9,671,559 B2 * 6/2017 Chen ....................... H04B 10/60
9,854,336 B2 * 12/2017 Schindler ............ H04J 14/0307
9,887,773 B2 * 2/2018 Wang ................... G02B 6/4215
10,546,963 B2 * 1/2020 Hon ...................... H10F 30/221
10,659,154 B2 * 5/2020 Toda ................... H04J 14/0221
11,320,588 B1 * 5/2022 Mazed ..................... A61F 2/141
11,885,887 B1 * 1/2024 Mazed .................... G01S 17/34
11,892,746 B1 * 2/2024 Mazed .................... G02F 1/212
11,895,798 B2 * 2/2024 Winzer ................ G02B 6/4206
12,117,661 B2 * 10/2024 Yang .................... G02B 6/4246
12,556,299 B2 * 2/2026 Patel .................... H04B 10/671
2003/0095737 A1 * 5/2003 Welch .................... B82Y 20/00 385/14
2004/0033004 A1 * 2/2004 Welch ....................... H01S 5/22 385/14
2007/0285843 A1 * 12/2007 Tran ..................... G11C 13/025 360/245.9
2008/0013881 A1 * 1/2008 Welch ................ G02B 6/12004 385/14
2008/0138088 A1 * 6/2008 Welch ..................... H01S 5/026 398/183
2008/0259455 A1 * 10/2008 Stuck ................... G02B 5/1809 977/788
2009/0180731 A1 * 7/2009 Christensen ........... G02B 6/125 385/13
2010/0136769 A1 * 6/2010 Keshavarz ................. C08J 3/12 977/840
2011/0103797 A1 * 5/2011 Oki ...................... G02B 6/4261 398/79
2011/0293275 A1 * 12/2011 Evans ................ H04B 10/2572 398/65
2014/0376856 A1 * 12/2014 Roh ..................... G02B 6/1226 385/14
2015/0378243 A1 * 12/2015 Kippelen .............. G02F 1/3523 359/244
2016/0004298 A1 * 1/2016 Mazed .................... G06F 3/011 345/633
2017/0123173 A1 * 5/2017 Ji ....................... G02B 6/12004
2017/0316487 A1 * 11/2017 Mazed ..................... B82Y 5/00
2018/0013494 A1 * 1/2018 Young .................. G02B 6/4213
2018/0045953 A1 * 2/2018 Fan .......................... G02B 5/18
2018/0217117 A1 * 8/2018 Tran ..................... G01N 27/122
2019/0044003 A1 * 2/2019 Heck ...................... G02B 1/002
2019/0179163 A1 * 6/2019 Baehr-Jones .......... G02B 6/105
2020/0365464 A1 * 11/2020 Sreenivasan ....... G02B 6/12004
2021/0044356 A1 * 2/2021 Aboagye ................ G02B 6/423
2021/0159997 A1 * 5/2021 Nagarajan .............. H04B 10/40
2021/0373242 A1 * 12/2021 Lee ...................... G02B 6/1226
2021/0384989 A1 * 12/2021 Nagarajan .............. H04B 10/40
2021/0385560 A1 * 12/2021 Nagarajan .......... H04Q 11/0005
2021/0385975 A1 * 12/2021 Nagarajan ............ G02B 6/4269
2021/0389533 A1 * 12/2021 Mathai ................. G02B 6/4244
2022/0342150 A1 * 10/2022 Karhade .............. G02B 6/1225
2023/0087809 A1 * 3/2023 Li ............................ G02B 6/32 385/33
2023/0089433 A1 * 3/2023 Li ........................ G02B 6/4204 385/49
2023/0089494 A1 * 3/2023 Li ........................ G02B 6/4232 385/14
2023/0089877 A1 * 3/2023 Karhade .............. G02B 6/4206 385/33
2023/0092821 A1 * 3/2023 Karhade .............. G02B 6/4204 385/14
2023/0185011 A1 * 6/2023 Shi ........................ G02B 6/0036 349/65
2023/0185033 A1 * 6/2023 Darmawikarta ... G02B 6/12004 385/14
2023/0236351 A1 * 7/2023 Shi ........................ G02B 6/0035 349/65
2024/0019647 A1 * 1/2024 Lin ........................ G02B 6/262
2026/0012282 A1 * 1/2026 Capasso ............... G02B 6/2817

FOREIGN PATENT DOCUMENTS

CN 102763263 A * 10/2012 ............ H01M 10/48
CN 118803462 A * 10/2024 ......... H04Q 11/0071
CN 119270427 A * 1/2025 ............. G02B 6/136
DE 10319154 B4 * 12/2012 ............... B82B 3/00
JP 2004078028 A * 3/2004
KR 20150090185 A * 8/2015 ......... H10K 59/8791
KR 20170051140 A * 5/2017 ........... H10H 20/857
WO WO-2005109581 A1 * 11/2005 ............ H10W 72/00
WO WO-2008054283 A1 * 5/2008 ........... G02B 6/1225
WO WO-2014100702 A2 * 6/2014 ........... G02F 1/0126
WO WO-2022001685 A1 * 1/2022 ............... G02B 6/13
WO WO-2023279997 A1 * 1/2023 ............... G02B 6/42

OTHER PUBLICATIONS

Frederik Van Laere et al., "Nanophotonic Polarization Diversity Demultiplexer Chip," Feb. 13, 2009, Journal of Lightwave Technology, vol. 27, No. 4, Feb. 15, 2009, pp. 1-5.*
Fred Kish et al. , "System-on-Chip Photonic Integrated Circuits," Jun. 15, 2017, IEEE Journal of Selected Topics in Quantum Electronics, vol. 24, No. 1, Jan./Feb. 2018, pp. 1-14.*
Hailong Zhoua et al.,"All-in-one silicon photonic polarization processor,"Nanophotonics 2019; 8(12),pp. 2257-2265.*
Bing Shen et.,"Increasing the density of passive photonicintegrated circuits via nanophotonic cloaking,"Nov. 9, 2016, Nature Communications, 7:13126,pp. 1-6.*
Wesley D. Sacher et al.,"Monolithically Integrated Multilayer Silicon Nitride-on-Silicon Waveguide Platforms for 3-D Photonic," Nov. 20, 2018, Proceedings of the IEEE , vol. 106, No. 12, Dec. 2018,pp. 2232-2241.*
Aaron J. Zilkie et al.,"Multi-Micron Silicon Photonics Platform for Highly Manufacturable and Versatile Photonic Integrated Circuits,"Apr. 15, 2019, IEEE Journal of Selected Topics in Quantum Electronics, vol. 25, No. 5, Sep./Oct. 2019,pp. 1-9.*
Yingjie Liu, Zi Wang et al.,"Ultra-Compact Mode-Division Multiplexed Photonic Integrated Circuit for Dual Polarizations," Jun. 28, 2021, Journal of Lightwave Technology, vol. 39, No. 18, Sep. 15, 2021,pp. 5925-5930.*
Ansheng Liu et al.,"Wavelength Division Multiplexing Based Photonic Integrated Circuits on Silicon-on-Insulator Platform," Nov. 24, 2009, IEEE Journal of Selected Topics in Quantum Electronics, vol. 16, No. 1, Jan./Feb. 2010,pp. 23-30.*

* cited by examiner

SYSTEM AND METHODS FOR EPIC ARCHITECTURE

CROSS-REFERENCE TO RELATED APPLICATION

This application claims the priority benefit under 35 U.S.C. § 119(e) of U.S. Provisional Patent Application Ser. No. 63/546,164 filed on Oct. 27, 2023, the disclosure of which is incorporated herein by reference in its entirety.

TECHNICAL FIELD

The subject matter disclosed herein relates to packaging. More particularly, the subject matter disclosed herein relates to a technique for connecting between electronic integrated circuits (EICs) and photonic integrated circuits (PICs).

BACKGROUND

Semiconductor devices may connect to additional devices and circuitry on different substrates, including between electronic integrated circuits and photonic integrated circuits. However, forming connections between electronic integrated circuits and photonic integrated circuits may experience difficulties. It is further noted that background concepts discussed herein are for informational purposes only and are not intended to limit the present disclosure.

SUMMARY

An example embodiment provides a device including an electronic integrated circuit, the electronic integrated circuit including an optical demultiplexer and at least one photodetector optically coupled to the optical demultiplexer. The optical demultiplexer may have at least one nanostructured layer, the at least one nanostructured layer being able to receive an incoming optical signal and the at least one nanostructured layer separating the incoming optical signal into a first separated optical signal and a second separated optical signal. The at least one photodetector may have a first photodetector and a second photodetector, the first photodetector may receive the first separated optical signal and the second photodetector may receive the second separated optical signal.

In some embodiments, the at least one nanostructured layer separates the first separated optical signal and the second separated optical signal by polarization. In some embodiments, the at least one nanostructured layer separates the first separated optical signal and the second separated optical signal by wavelength. In some embodiments, the at least one nanostructured layer separates the first separated optical signal and the second separated optical signal by optical fiber mode. In some embodiments, the optical demultiplexer includes a plug connector configured to receive an optical fiber, and the optical fiber may transmit the incoming optical signal to the optical demultiplexer. In some embodiments, the optical demultiplexer includes at least one thin film optical coating layer contacting the at least one nanostructured layer. In some embodiments, the at least one thin film optical coating layer may be selected from at least one of a diffractive coating, an anti-reflection coating, a polarizing coating, and a filter coating.

In some embodiments, the at least one nanostructured layer may divide the first separated optical signal into a first divided optical signal and a second divided optical signal and the at least one nanostructured layer may divide the second separated optical signal into a third divided optical signal and a fourth divided optical signal. In some embodiments, the at least one nanostructured layer may separate the incoming optical signal into the first separated optical signal and the second separated optical signal by polarization and the at least one nanostructured layer may divide the first separated optical signal and the second separated optical signal into the first divided optical signal, the second divided optical signal, the third divided optical signal, and the fourth divided optical signal by wavelength. In some embodiments, the first photodetector has a first photodiode to receive the first divided optical signal and a second photodiode to receive the second divided optical signal. In some embodiments, the second photodetector has a third photodiode to receive the third divided optical signal and a fourth photodiode to receive the fourth divided optical signal.

An example embodiment provides a system, the system including a substrate having an electronic integrated circuit and a photonic integrated circuit mounted thereon. In some embodiments, the photonic integrated circuit may have an optical transmitter, with the optical transmitter optically coupled to a first optical fiber and the optical transmitter transmitting an outgoing optical signal via the first optical fiber. In some embodiments, the electronic integrated circuit may have an optical receiver and an optical demultiplexer, with the optical receiver optically coupled to a second optical fiber. In some embodiment, the second optical fiber may have an incoming optical signal. In some embodiments, the optical demultiplexer may demultiplex the incoming optical signal into a first optical signal and a second optical signal. In some embodiments, the electronic integrated circuit may have a first photodetector and a second photodetector, with the first photodetector receiving the first optical signal, and the second photodetector receiving the second optical signal.

In some embodiments, the optical demultiplexer has a first nanostructured layer, the first nanostructured layer separating the incoming optical signal into the first optical signal and the second optical signal. In some embodiments, the optical transmitter includes a first plug connector configured to receive the first optical fiber and the optical receiver includes a second plug connector configured to receive the second optical fiber.

In some embodiments, the first optical signal has a first set of wavelengths, and the second optical signal has a second set of wavelengths. In some embodiments, the first photodetector is a first group of neighboring photodetectors and the second photodetector is a second group of neighboring photodetectors. In some embodiments, the optical demultiplexer divides the first set of wavelengths across the first group of neighboring photodetectors and the optical demultiplexer divides the second set of wavelengths across the second group of neighboring photodetectors. In some embodiments, the first group of neighboring photodetectors is a 2-D array and the second group of neighboring photodetectors is a 2-D array. In some embodiments, the first group of neighboring photodetectors is a circular array and the second group of neighboring photodetectors is a circular array.

An example embodiment provides a device including an optical demultiplexer having a nanostructure layer, the optical demultiplexer having a first side and a second side, the second side opposite the first side. In some embodiments, an optical fiber input may contact the first side. In some embodiments, the optical fiber input may transmit an optical input signal into the optical demultiplexer. In some embodiments, the nanostructure layer may split the optical input signal into a first optical output signal and a second optical output signal. In some embodiments, a first optical fiber output may contact the second side, with the first optical fiber output receiving the first optical output signal from the optical demultiplexer. In some embodiments, a second optical fiber output may contact the second side, with the second optical fiber output receiving the second optical output signal from the optical demultiplexer.

In some embodiments, the nanostructure layer splits the first optical output signal and the second optical output signal by polarization. In some embodiments, the nanostructure layer splits the first optical output signal and the second optical output signal by wavelength. In some embodiments, the nanostructure layer splits the first optical output signal and the second optical output signal by optical fiber mode. In some embodiments, the first side includes a first plug connector configured to receive a first optical fiber and the second side includes a second plug connector configured to receive a second optical fiber.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1A:
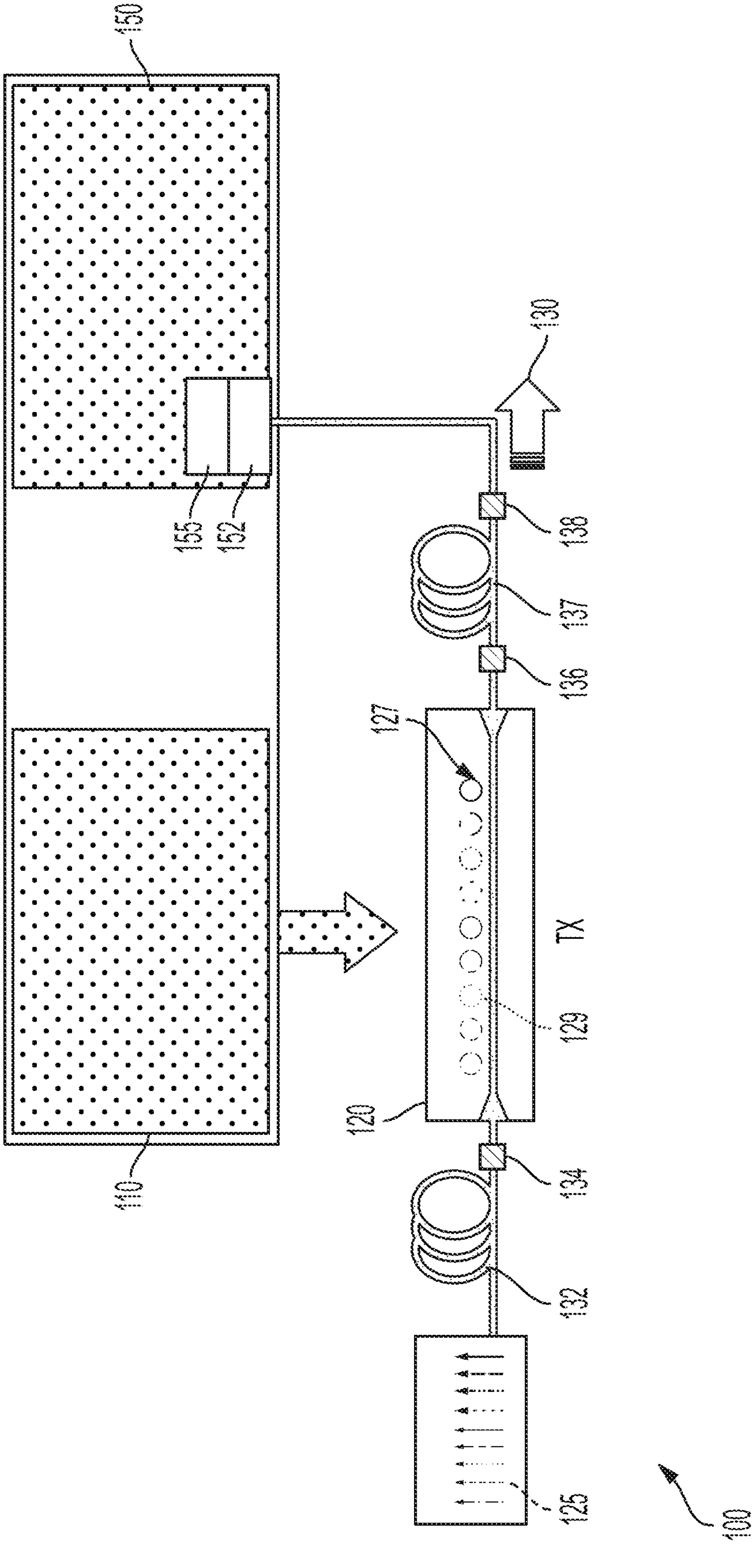
FIG. 1A depicts a plan view of an example embodiment of a hybrid electronic integrated circuit and photonic integrated circuit system architecture according to various embodiments of the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," etc.) may be occasionally interchangeably used with a corresponding non-hyphenated version (e.g., "two dimensional," "predetermined, etc.), and a capitalized entry (e.g., "Integrated Chip," "First Substrate," "PIC," etc.) may be interchangeably used with a corresponding non-capitalized version (e.g., "integrated chip," "first substrate," "pic," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Disclosed herein are various devices, structures and methods for forming an optical interconnection between devices including both electronic integrated circuits (EICs) and photonic integrated circuits (PICs). In some embodiments, a hybrid transceiver may use a combination of EICs and PICs to transmit and receive optical signals between devices. In some embodiments, a first hybrid transceiver may bi-directionally communicate with a second hybrid transceiver using an optical interconnection.

As used herein electronic integrated circuits, or EICs, may refer to a wide variety of integrated circuits using electrical components. In some embodiments, EICs may include a combination of various electrical components such as transistors, resistors, inductors, and capacitors which in combination form an electronic circuit on a substrate. In some embodiments, EICs may include central processing units (CPUs), logic chips, memory such as static random-access memory (SRAM), dynamic random-access memory (DRAM), application processors (AP), graphical processing units (GPUs), artificial intelligence (AI) chips, High bandwidth memory (HBM) interfaces, and other application-specific integrated circuits (ASIC). In some embodiments, a combination of circuits may be present on a substrate. In some embodiments, EICs may be referred to in terms such as microchips, microcontrollers, silicon chips.

As used herein photonic integrated circuits, or PICs, may refer to a wide variety of integrated circuits using photonic components. In some embodiments, PICs may include a combination of various photonic components such as waveguides, optical filters, gratings, lenses, mirrors, and optical ring resonators. In some embodiments, PICs may include electrical components such as photodiodes, light emitting diodes, and laser diodes. In some embodiments, PICs may be referred to using terms such as integrated optical circuits, and planar light wave circuits.

As used herein substrates may refer to a variety of materials and structures, including wafers using silicon, wafers using silicon on an insulator (SOI) such as glass, wafers of other semiconductor materials such as germanium, as well as other semiconductor materials on an insulator. In some embodiments, a substrate may include an organic material. In some embodiments, the substrates may be referred to as wafers, dies, and chips alone or in combination. In some embodiments, a substrate for use in a PIC may be referred to a waveguide. Bonding substrates may be thus known in some embodiments as die-to-die (D2D) bonding, wafer-to-wafer bonding (W2W) or die-to-wafer bonding (D2W). In some embodiments, a packaged chip may contain multiple substrates, and may include PIC substrates, EIC substrates, or a combination of PIC substrates and EIC substrates.

As used herein multiplexing may refer to a number of techniques for multiplexing optical signals. In some embodiments, multiplexing may refer to wavelength division multiplexing (WDM). In some embodiments, the multiplexing may refer to polarization-based multiplexing. In some embodiments, the multiplexing may refer to optical fiber mode based polarization. In some embodiments, multiplexing may be a combination of one or more of WDM, polarization, and fiber mode polarization.

As used herein, polarization may refer to both linear and circular polarization. Linear polarization modes may be referred to as S and P or transverse-magnetic (TM) and transverse-electric (TE) polarizations. Circular polarizations may be referred to as right-handed polarization (RCP) or left-handed polarization (RCP).

As used herein, a nanostructured layer is a layer such as a thin film layer having one or more structures in the nanometer (nm) region, the structures having dimensions of approximately 1 nm to 1,000 nm. The nanostructure layer may comprise a single individual structure, or may comprise a plurality of structures. The nanostructure layer may comprise an array of individual nanostructures, with the individual nanostructures having one or more shapes, such as rods, cylinders, circles, squares, rectangles, or any other suitable shape. In some embodiments, an array of nanostructures may form a repeating pattern where the orientation, shape, and size may alter between nanostructures. In some embodiments, the nanostructured layer may form a metastructure such as a metalens. In some embodiments, the nanostructured layer may form a grating structure. In some embodiments, the nanostructure layer may be a plurality of layers, and may include additional optical elements in conjunction with nanostructures. The additional optical elements may include multiple thin-film optical coatings like Bragg filter coatings, diffractive coatings, polarizing coatings, and anti-reflective coatings.

In some embodiments, nanostructures may split an incoming light beam into multiple light beams. In some embodiments, the nanostructures may split the same and/or different wavelengths in different locations using the grating equation, and may use the wavelength dispersive properties of metastructures. In some embodiments, nanostructures may split polarizations based on the size of the nanostructures and their geometry. In some embodiments, Bragg filters may be incorporated to further disperse wavelengths based on resonance conditions.

FIG. 1A discloses an exemplary embodiment of an architecture for an optical communication system 100. The optical communication system 100 includes a transmitter EIC 110, a transmitter PIC 120 and a receiver EIC 150 which communicate via an optical signal 130. The optical signal 130 is generated by a light source which may take the form of a laser comb source 125. The laser comb source 125 may take the form of a four-wave-mixing-based frequency comb, a Kerr frequency comb, or any other suitable technique for generating a comb signal. As used herein, a comb signal refers to an optical signal having a plurality of wavelengths separated into discrete spectra. The optical signal 130 travels from the laser comb source 125 via a first optical fiber 132 to the transmitter PIC 120. In some embodiments, a first fiber link 134 may connect between the first optical fiber 132 and the transmitter PIC 120. In some embodiments, the first fiber link 134 may take the form of a pluggable optical connector or plug connector. In the transmitter PIC 120, the optical signal 130 may be modulated and adjusted by photonic elements embedded within the transmitter PIC 120, including micro-ring resonators, phase shifts, couplers, lenses, polarizers, mirrors, delay lines, and a variety of other photonic elements both passive and active. In the exemplary embodiment of FIG. 1A, the transmitter PIC 120 includes a modulator 127 containing one or more micro-ring resonators 129. The one or more micro-ring resonators 129 may include micro-ring resonators designed to modulate a specific spectra from the laser comb source 125, with a plurality of micro-ring resonators allowing some or all of the comb of spectras from the laser comb source 125 to be modulated. In addition, additional modulation elements may be used, for example, applying a modulation based on fiber mode or polarization.

The transmitter EIC 110 provides the driving electronics for the transmitter PIC 120, and the transmitter EIC 110 may include heater control circuits, heater drivers, modulator drivers, and serializers to modify the optical signal 130 being transmitted via the transmitter PIC 120. For example, if the transmitter PIC 120 includes one or more micro-ring resonators 129, heaters may be integrated with the one or more micro-ring resonators 129 to provide control over the resonance frequency of the one or more micro-ring resonators 129 by altering the physical characteristics of the one or more micro-ring resonators 129. While portions of the heaters may be formed within the transmitter PIC 120, the electronics controlling and regulating the heaters are within the transmitter EIC 110. Additional details of the transmitter EIC 110 will be discussed further below, for example in FIG. 1C and FIG. 1D.

From the transmitter PIC 120, the optical signal 130 is transmitted, for example, via a second optical fiber 137, to the receiver EIC 150. In some embodiments, a second fiber link 136 may connect the transmitter PIC 120 to the second optical fiber 137, and a third fiber link 138 may connect the second optical fiber 137 to the receiver EIC 150. In some embodiments, the second fiber link 136 and/or the third fiber link 138 may take the form of a pluggable fiber connector.

The optical signal 130 is received in the receiver EIC 150 by an optical demultiplexer 152. The optical demultiplexer 152 may include at least one nanostructured layer. The optical demultiplexer 152 separates the optical signals 130 into a plurality of demultiplexed optical signals which are transmitted to a photodetector array 155. At the photodetector array 155, the plurality of demultiplexed optical signals are spread out across the array, allowing individual photodetectors to separately read the individual optical signals of the plurality of demultiplexed optical signals. The receiver EIC 150 may include additional supporting electronics for interpreting the received signals, including receivers, amplifiers, comparators, analog-to-digital converters (ADCs), deserializers, and supporting processors. The electronics of the receiver EIC 150 are discussed in further depth below, for example in FIG. 1C and FIG. 1D.

Figure 1B:
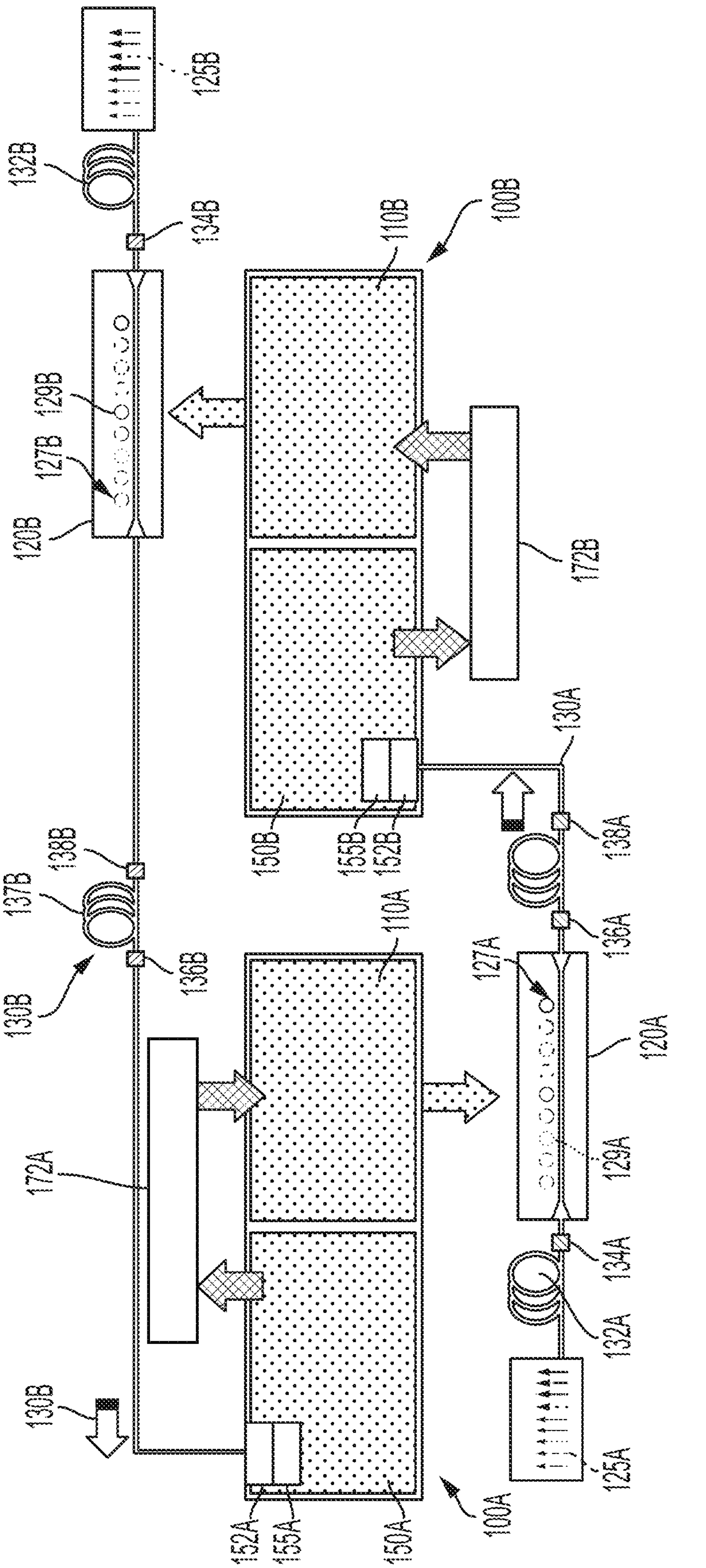
FIG. 1B depicts a plan view of an example embodiment of a hybrid electronic integrated circuit and photonic integrated circuit system architecture according to various embodiments of the subject matter disclosed herein.

FIG. 1B discloses an exemplary embodiment of a pair of optical communications systems in optical communication, including a first optical communications system 100A and a second optical communications system 100B. The first optical communications system 100A and the second optical communications system 100B may take the form of the optical communication system 100. Thus, components of the first optical communications system 100A are labeled with the same reference numerals as described in FIG. 1A and appended with the letter "A" while and components of the second optical communications system 100B are labeled with the same reference numerals as described in FIG. 1A the second optical communications system 100B and appended with the letter "B". The first optical communications system 100A may be arranged to transmit signals to the second optical communications system 100B, while the second optical communications system 100B may be arranged to transmit signals to the first optical communications system 100A.

Each of the first optical communications system 100A and second optical communications system 100B has a laser comb source 125A/125B providing an optical signal 130A/130B via a first optical fiber 132A/132B to the transmitter PIC 120A/120B. In some embodiments, a first fiber link 134A/134B may connect between the first optical fiber 132A/132B and the transmitter PIC 120A/120B. In some embodiments, the first fiber link 134A/134A may take the form of a pluggable optical connector. In the transmitter PIC 120A/120B, the optical signal 130A/130B may be modulated and adjusted by photonic elements embedded within the transmitter PIC 120A/120B, including micro-ring resonators, phase shifts, couplers, lenses, polarizers, mirrors, delay lines, and a variety of other photonic elements both passive and active. In the exemplary embodiment of FIG. 1B, the transmitter PIC 120A/120B includes a modulator 127A/127B containing one or more micro-ring resonators 129A/129B. The one or more micro-ring resonators 129A/129B may include micro-ring resonators designed to modulate a specific spectra from the laser comb source 125A/125B, with a plurality of micro-ring resonators allowing some or all of the comb of spectras from the laser comb source 125A/125B to be modulated. In addition, additional modulation elements may be used, for example, applying a modulation based on fiber mode or polarization.

The transmitter EIC 110A/110B provides the driving electronics for the transmitter PIC 120, and the transmitter EIC 110A/110B may include heater control circuits, heater drivers, modulator drivers, and serializers to modify the optical signal 130A/130B being transmitted via the transmitter PIC 120. For example, if the transmitter PIC 120 includes one or more micro-ring resonators 129A/129B, heaters may be integrated with the one or more micro-ring resonators 129A/129B to provide control over the resonance frequency of the one or more micro-ring resonators 129A/129B by altering the physical characteristics of the one or more micro-ring resonators 129A/129B. While portions of the heaters may be formed within the transmitter PIC 120A/120B, the electronics controlling and regulating the heaters are within the transmitter EIC 110A/110B.

From the transmitter PIC 120A/120B, the optical signal 130A/130B is transmitted, for example, via a second optical fiber 137A to the receiver EIC 150B and via a second optical fiber 137B to the receiver EIC 150B. In some embodiments, a second fiber link 136A/136B may connect the transmitter PIC 120A/120B to the second optical fiber 137A/137B, and a third fiber link 138A/138B may connect the second optical fiber 137A/137B to the receiver EIC 150A/150B. In some embodiments, the second fiber link 136A/136B and/or the third fiber link 138A/138B may take the form of a pluggable fiber connector.

The optical signal 130A/130B is received in the receiver EIC 150A/150B by an optical demultiplexer 152A/152B. The optical demultiplexer 152A/152B may include at least one nanostructured layer. The optical demultiplexer 152A/152B separates the optical signals 130A/130B into a plurality of demultiplexed optical signals which are transmitted to a photodetector array 155A/155B. At the photodetector array 155A/155B, the plurality of demultiplexed optical signals are spread out across the array, allowing individual photodetectors to separately read the individual optical signals of the plurality of demultiplexed optical signals. The receiver EIC 150A/150B may include additional supporting electronics for interpreting the received signals, including receivers, amplifiers, comparators, deserializers, ADCs, and supporting processors.

FIG. 1B also show a first host 172A in communication with the first optical communications system 100A and a second host 172B in communication with the second optical communications system 100B. Each of the first host 172A and the second host 172B may include a switch, a GPU, a CPU, and/or another auxiliary processing unit (xPU). The first host 172A and the second host 172B may be coupled to receive communication from the receiver EIC 150A/150B, and may be coupled to transmit communications to the transmitter EIC 110A/110B. Additionally, in some embodiments, the first host 172A and the second host 172B may communicate with the laser comb source 125A/125B either directly or via the transmitter EIC 110A/110B to control the light source and provide another source of modulation.

Figure 1C:
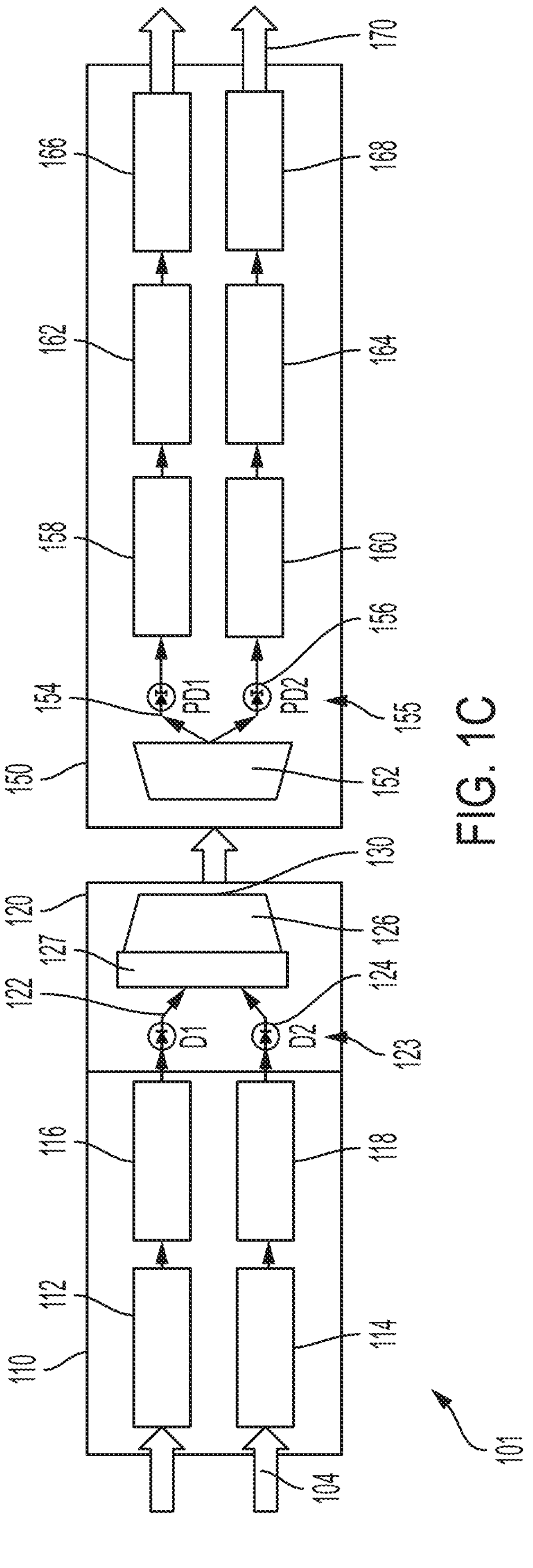
FIG. 1C depicts a plan view of an example embodiment of a hybrid electronic integrated circuit and photonic integrated circuit system architecture according to various embodiments of the subject matter disclosed herein.

FIG. 1C discloses an exemplary embodiment of an architecture for an optical communication system 101. The optical communication system 101 may comprise the components of the optical communication system 100 with the additional inclusion of further details of the electronic components of the transmitter EIC 110 and the receiver EIC 150. The transmitter EIC 110 receives an incoming signal 104 and routes the incoming signal 104 to a first digital processor 112 and a second digital processor 114. The first digital processor 112 and the second digital processor 114 receive instructions from the incoming signal 104 for a first laser driver 116 and a second laser driver 118. The first laser driver 116 and the second laser driver 118 provide the driving signal to a laser array 123 including at least a first laser diode 122 and a second laser diode 124, respectively, on the transmitter PIC 120. In some embodiments, the laser diodes of the laser array 123 may be modulated by the laser drivers to create a set of modulated optical signals. In some embodiments, the laser array 123 may be comprised of an array of lasers diodes having a plurality of spectra. The emitted light from the laser array 123 is transmitted to the optical multiplexer 126, to form a multiplexed optical signal 130. In some embodiments, the modulator 127 may be inserted between the laser array 123 and the optical multiplexer 126 to modulate the light in addition to or alternatively with the laser array 123. In some embodiments, the laser array 123 may form the control signal for the modulator 127 which may modulate light from a laser comb source 125 as discussed above with respect to FIGS. 1A and 1B.

The multiplexed optical signal 130 is transmitted, for example, via an optical fiber, to the receiver EIC 150. The multiplexed optical signal 130 is received in the receiver EIC 150 by an optical demultiplexer 152. The optical demultiplexer 152 may include at least one nanostructured layer. The nanostructured layer of the optical demultiplexer 152 separates the multiplexed optical signal 130 into multiple optical signals, and transmits the optical signals to a photodetector array 155 including transmitting a first optical signal to a first photodetector 154, and transmitting a second optical signal to a second photodetector 156. At the first photodetector 154, a first electrical signal is generated and transmitted to a first Trans-Impedance Amplifier (TIA) 158 for amplification. In some embodiments, the first TIA 158 may include an additional amplifier. At the second photodetector 156, a second electrical signal is generated and transmitted to a second TIA 160 for amplification. The first TIA 158 and the second TIA 160 transmit the first electrical signal and second electrical signal, respectively, to a first analog-to-digital converter (ADC) 162 and a second ADC 164 to convert the analog signals into digital signals. In some embodiments a comparator may be used alongside or in place of an ADC. The digital signals from the first ADC 162 and the second ADC 164 are then transmitted to a third digital processor 166 and a fourth digital processor 168, respectively. From the third digital processor 166 and the fourth digital processor 168, outgoing signals 170 may be further transmitted to additional electrical components such as a host. The outgoing signals 170 may represent a data signal or other form of communications signal.

Figure 1D:
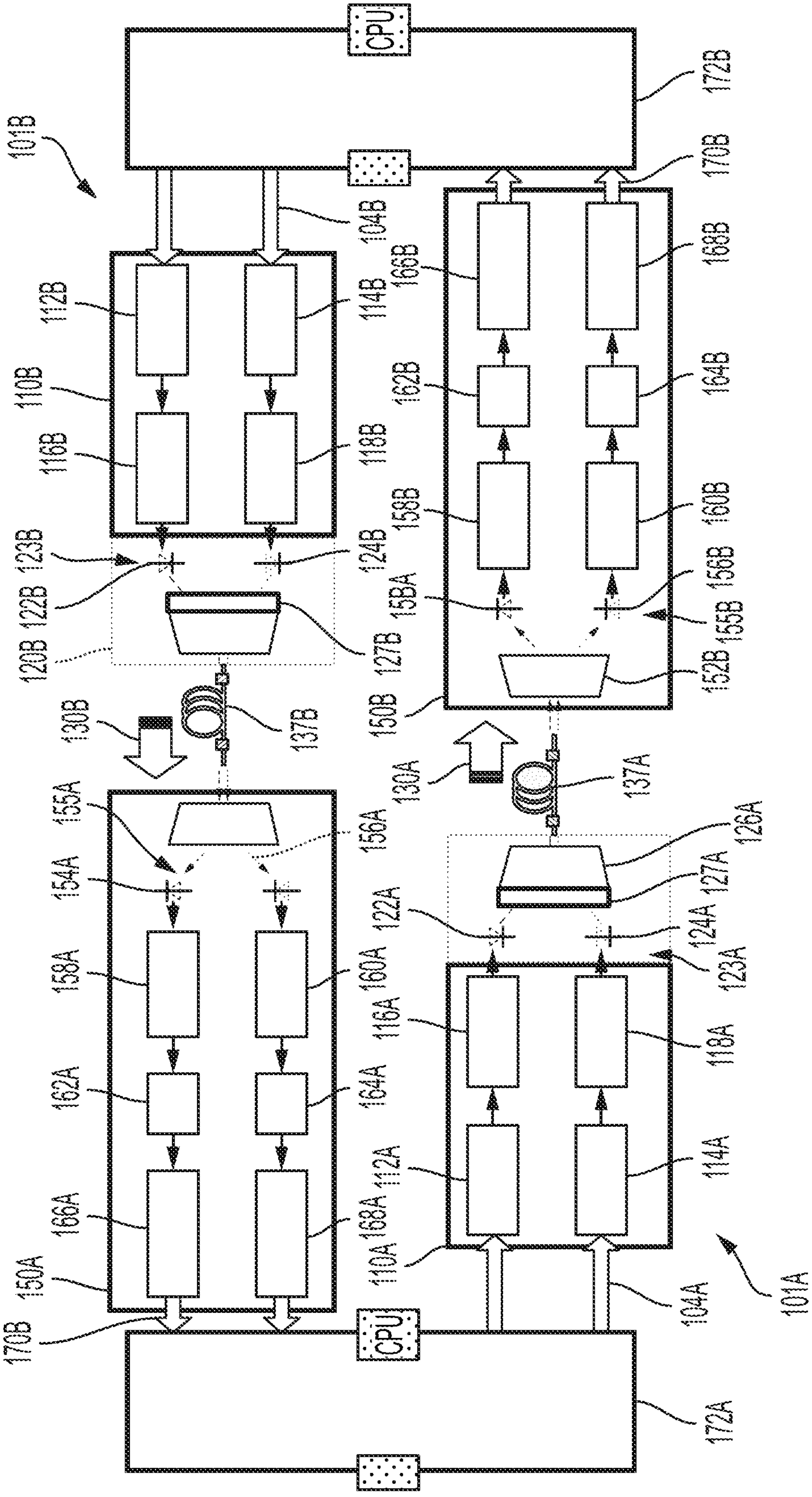
FIG. 1D depicts a plan view of an example embodiment of a hybrid electronic integrated circuit and photonic integrated circuit system architecture according to various embodiments of the subject matter disclosed herein.

FIG. 1D depicts an exemplary embodiment of a pair of optical communications systems in optical communication, including a first optical communications system 101A and a second optical communications system 101B. The components of the first optical communications system 101A and second optical communications system 101B may take the form of the optical communications system 101 with additional details demonstrating the systems in process. The first host 172A transmits a first incoming signal 104A to the first EIC 110A where the first digital processor 112A and the second digital processor 114A process the incoming signal and communicate the instructions to the first laser driver 116A and the second laser driver 118A which are driven accordingly. The first laser driver 116A and the second laser driver 118A are driven to produce the desired optical signal in the laser array 123A on the first transmitter PIC 120A, which is optionally modulated by the modulator 127A prior to reaching the optical multiplexer 126A. The laser array 123A includes at least the first laser diode 122A and the second laser diode 124A which can differ in spectra and modulated signal produced by their respective laser drivers. The multiplexed optical signal 130A is transmitted from a first transmitter PIC 120A via the second optical fiber 137A to a second receiver EIC 150B of the second optical communications system 101B. The second receiver EIC 150B receives the signal at the optical demultiplexer 152B which separates the multiplexed optical signal 130A into a plurality of separated optical signals. The separated optical signals are transmitted to the photodetector array 155B with a first separated signal transmitted to a first photodetector 154B and a second photodetector 156B. The photodetector array 155 generates a set of electrical signals which are then processed by the first TIA 158B and the second TIA 160B to provide amplification. Amplified analog signals from the first TIA 158B and the second TIA 160B may then be transmitted to the first ADC 162B and the second ADC 164 B, respectively. At the first ADC 162B and the second ADC 164B, the analog signals are digitized into digital signals, and in some embodiments, may be compared to a threshold value using a comparator. The digital signals from the first ADC 162B and the second ADC 164B are then transmitted to the third digital processor 166B and the fourth digital processor 168B, respectively. From the third digital processor 166B and the fourth digital processor 168B, outgoing signals 170B may be transmitted to the second host 172B. In some embodiments, the outgoing signals 170B may comprise data signals, or may comprise various forms of communications signals.

The second host 172B may respond in a similar manner to the first host 172A, transmitting a second incoming signal 104B to the second EIC 110B where the first digital processor 112B and the second digital processor 114B process the incoming signal and communicate the instructions to the first laser driver 116B and the second laser driver 118B which are driven accordingly. The first laser driver 116B and the second laser driver 118B are driven to produce the desired optical signal in the laser array 123B on the second transmitter PIC 120B, which is optionally modulated by the modulator 127B prior to reaching the optical multiplexer 126B. The laser array 123B includes at least the first laser diode 122B and the second laser diode 124B which can differ in spectra and modulated signal produced by their respective laser drivers. The multiplexed optical signal 130B is transmitted from the second transmitter PIC 120B via the second optical fiber 137B to a first receiver EIC 150A of the first optical communications system 101A. The first receiver EIC 150A receives the signal at the optical demultiplexer 152A which separates the multiplexed optical signal 130B into a plurality of separated optical signals. The separated optical signals are transmitted to the photodetector array 155 with a first separated signal transmitted to a first photodetector 154A and a second photodetector 156A. The photodetector array 155A generates a set of electrical signals which are then processed by the first TIA 158A and the second TIA 160A. Signals from the first TIA 158A and the second TIA 160A are transmitted to the first ADC 162A and the second ADC 164 A, respectively. At the first ADC 162A and the second ADC 164A, the signals are digitized into digital signals, and in some embodiments, may be compared to a threshold value using a comparator. The digital signals from the first ADC 162A and the second ADC 164A are then transmitted to the third digital processor 166A and the fourth digital processor 168A, respectively. From the third digital processor 166A and the fourth digital processor 168A, outgoing signals 170A may be transmitted to the first host 172A. In some embodiments, the outgoing signals 170A may comprise data signals, or may comprise various forms of communications signals.

Figure 2:
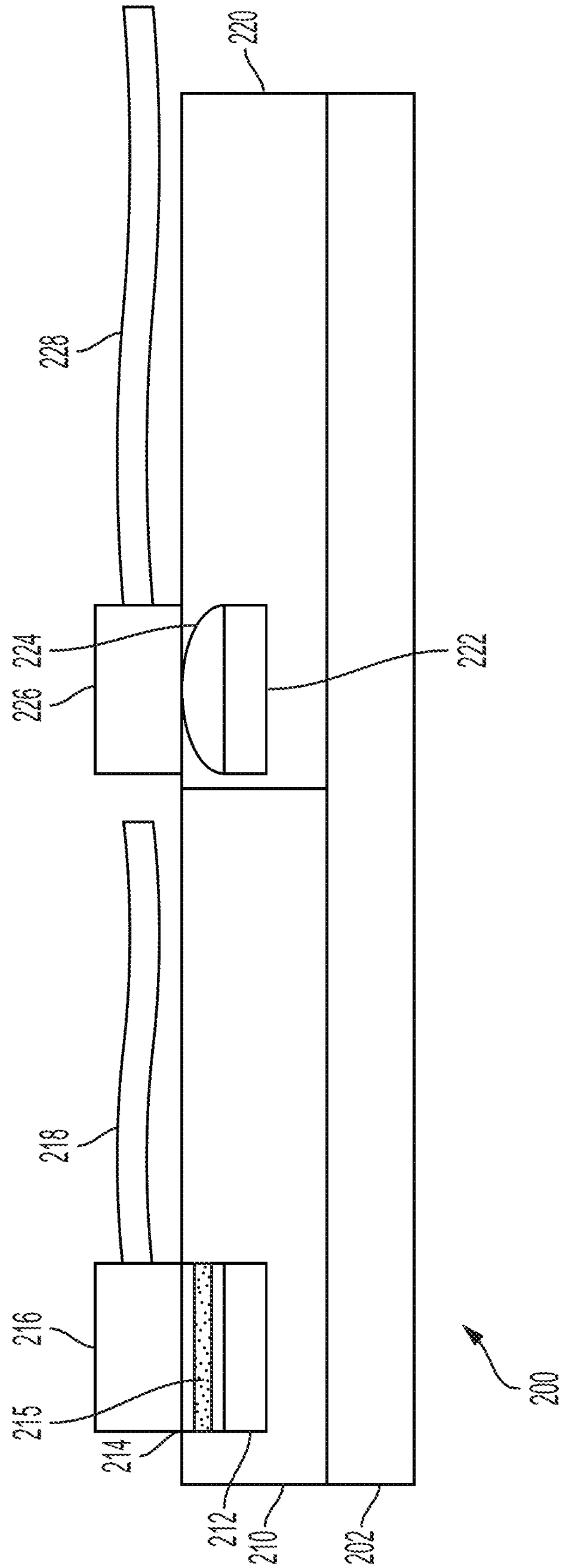
FIG. 2 depicts a cross-sectional view of an example embodiment of an on-chip hybrid transceiver according to various embodiments of the subject matter disclosed herein.

FIG. 2 discloses an exemplary embodiment of an on-chip hybrid transceiver 200. In comparison to the optical communication system 100 or the optical communication system 101, the on-chip hybrid transceiver 200 is a single packaged chip. As shown in the illustrative embodiment of FIG. 2, an EIC 210 and a PIC 220 share a common substrate 202.

The EIC 210 is an optical receiver, and includes an array of photodetectors 212. The photodetectors of the array of photodetectors 212 may be any known form of photosensitive sensors, such as photodiodes. The shape of the array of photodetectors 212 may include a linear array, a 2-D array, a circular array, and other configurations. The array of photodetectors 212 may be surface mounted on the EIC 210 or may be buried within the EIC 210. An optical demultiplexer 214 contacts and is optically coupled to the array of photodetectors 212. The optical demultiplexer 214 may take the form of the optical demultiplexer 152 and includes at least one nanostructured layer 215. The at least one nanostructured layer 215 may be spaced from the array of photodetectors 212 with additional thin film optical coating layers or may directly contact the array of photodetectors 212. The thin film optical coating layers may include one or more optical elements such as polarizers, gratings, antireflection coatings, filters, etc. The optical demultiplexer 214 connects to and is optically coupled to a first fiber connector 216. The first fiber connector 216 couples light from an incoming optical fiber 218 to the optical demultiplexer 214. The optical demultiplexer 214 receives an incoming optical signal via the incoming optical fiber 218. The optical demultiplexer 214 splits the incoming optical signal into a plurality of demultiplexed signals. The optical demultiplexer 214 may split the signals into demultiplex signals based on one or more of polarization, wavelength, and optical fiber mode. The demultiplexed signals are then dispersed to the array of photodetectors 212. In some embodiments, the optical demultiplexer 214 may use the at least one nanostructured layer 215 to split the incoming optical signal into the plurality of demultiplexed signals. The array of photodetectors 212 may have the individual photodetectors spaced apart to receive distinct portions of plurality of demultiplexed signals. For example, the optical demultiplexer 214 may generate a dispersion pattern such that different wavelengths, polarizations, and/or modes of light may be spread across the face of the array of photodetectors 212. In such cases, the individual photodetectors of the array of photodetectors 212 may thus receive a different portion of the incoming signal, allowing sensing of the demultiplexed light. The optical demultiplexer 214 may further divide separated signals into additional divisions, with a first separated signal being divided into a first divided signal and a second divided signal. The division may take place upon a second form of modulation, for example, first separating the multiplexed signal based on wavelength before dividing the separated signals based on polarization or fiber mode.

The PIC 220 is an optical transmitter, and includes a plurality of light emitting diodes 222, which emit a beam of light onto optical elements 224. In some embodiments, the plurality of light emitting diodes 222 are organic light emitting diodes (OLEDs). In some embodiments, the plurality of light emitting diodes 222 are laser diodes. The optical elements 224 may provide adjustments to the emitted light from the plurality of light emitting diodes 222, and may include one or more elements such as lenses, mirrors, filters, gratings, etc. The optical elements 224 are further coupled to a second fiber connector 226, which couples the adjusted light from optical elements 224 into an outgoing optical fiber 228. The optical elements 224 may combine light from the plurality of light emitting diodes 222 such that light from different light emitting diodes may be multiplexed within the transmission optical fiber.

In some embodiments, each of the first fiber connector 216 and the second fiber connector 226 may be a pluggable optical fiber connector. As used herein, a pluggable optical fiber connector is an interface module allowing an optical fiber to be plugged directly to an optical interface. A pluggable optical fiber connector may include attachment mechanisms to allow for optical fibers to be easily connected and disconnected.

In some embodiments, each of the incoming optical fiber 218 and the outgoing optical fiber 228 may be a single mode fiber, a multi-mode fiber, a polarization dependent fiber, a polarization independent fiber, pluggable optical fibers, etc. Pluggable optical fibers may include a connection mechanism on a terminal end to allow for optical fibers to be easily connected and disconnected from a fiber optic connector.

Figure 3:
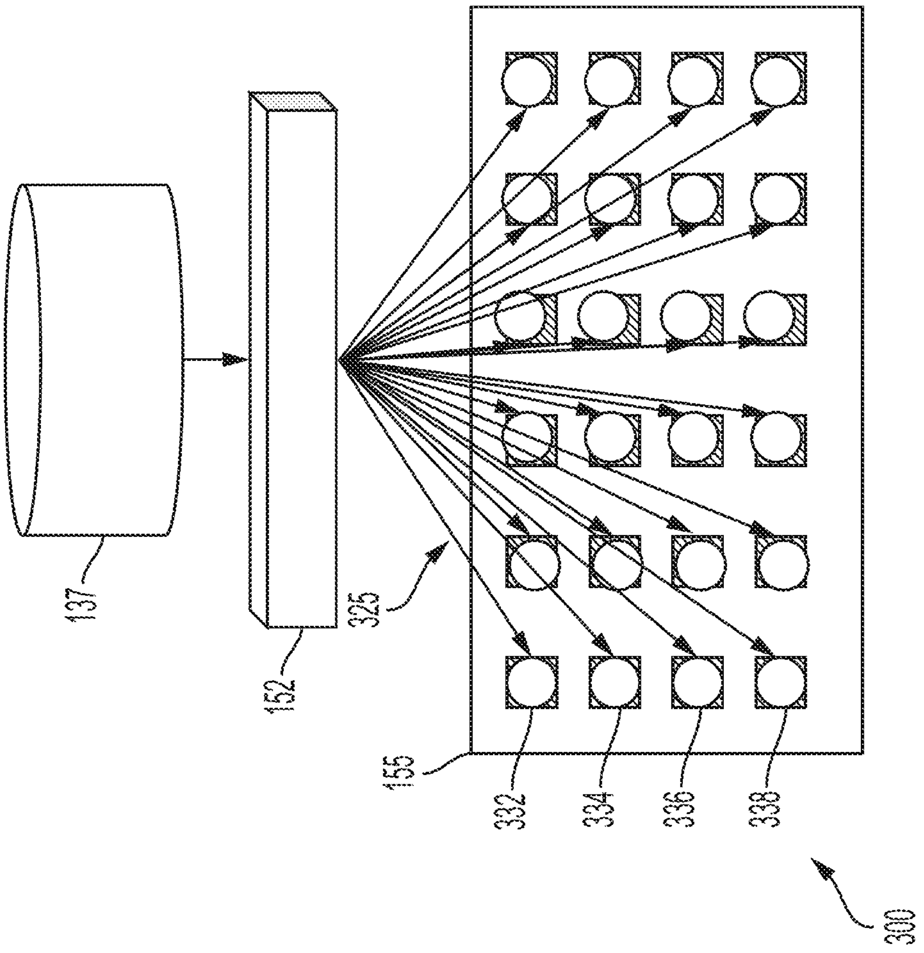
FIG. 3 depicts an exploded view of an example embodiment of an electronic integrated circuit according to various embodiments of the subject matter disclosed herein.

FIG. 3 discloses an exemplary embodiment of an optical demultiplexing receiver 300. In some embodiments, the optical demultiplexing receiver 300 may be part of an EIC such as the receiver EIC 150 or the EIC 210 using in an optical communications system such as optical communications system 100 or optical communications system 101. In some embodiments, the optical demultiplexing receiver 300 may be a standalone receiver. The optical demultiplexing receiver 300 includes the second optical fiber 137 providing an optical input signal. The optical input signal may be a multiplexed signal. The second optical fiber 137 provides the optical input signal to the optical demultiplexer 152. The optical demultiplexer 152 includes at least one nanostructured layer, and may include one or more additional optical layers such as gratings, filters, anti-reflection coatings, etc. The light from the optical input signal is split by the at least one nanostructured layer into a plurality of demultiplexed optical beams 325. The dispersion may be based on one or more of the wavelength, polarization, and fiber mode. The dispersed light of the plurality of demultiplexed optical beams 325 is transmitted to a photodetector array 155.

Figure 4:
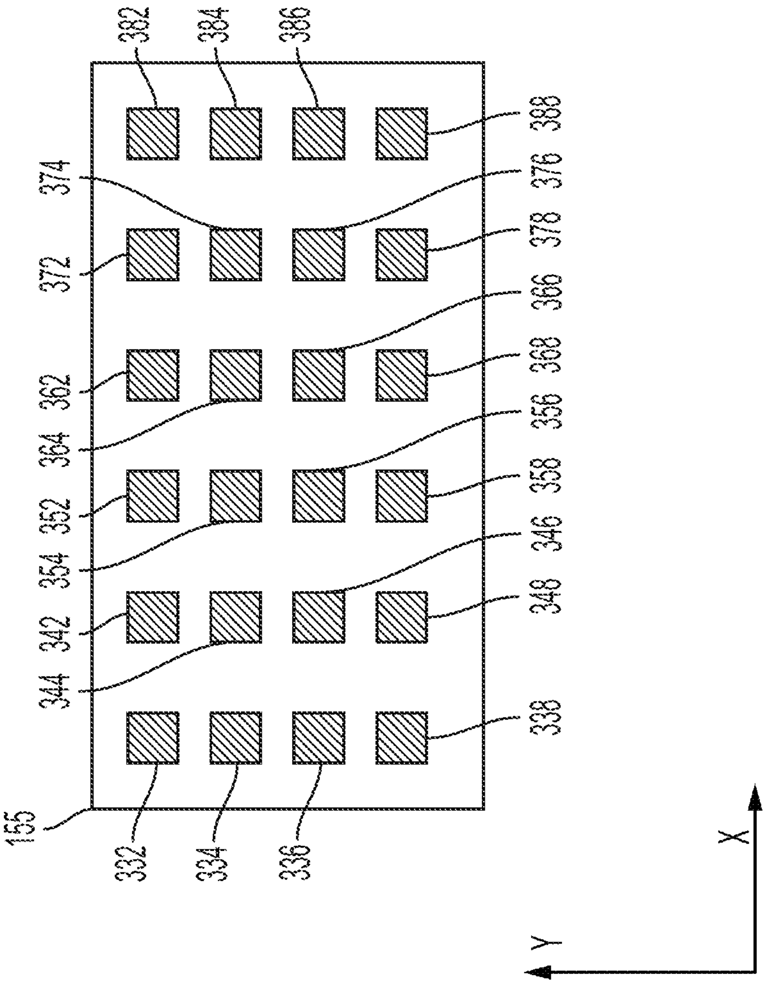
FIG. 4 depicts a plan view of an example embodiment of a linear photodetector array according to various embodiments of the subject matter disclosed herein.

FIG. 4. discloses an exemplary embodiment of the photodetector array 155 as also shown in FIG. 3. The photodetector array 155 receives the dispersed light from the plurality of demultiplexed optical beams 325. Light may be dispersed by the optical demultiplexer 152 in multiple directions and according to multiple parameters such as wavelength, polarization, and optical mode. The individual photodetectors of the photodetector array 155 are shown in a 2-D array of 4 rows by 6 columns. However, a photodetector array may vary in both shape and size. In some embodiments, the photodetector array 155 may be a linear array, a circular array, etc. In some embodiments, the number of photodetectors of the photodetector array 155 may comprise an M×N grid having M photodetectors per column and N photodetectors by row. M may vary from 1 to 200 or more, and N may also vary from 1 to 200 or more. The shape and size of the individual photodetectors may vary, as well as the type for photodetectors. For example, in some embodiments, the individual photodetectors may comprise photodiodes, avalanche photodiodes, phototransistors, and solaristors. In some embodiments, a photodetector may be made using inline processing as part of an integrated circuit.

In the exemplary embodiment of FIG. 4, the photodetector array 155 has a first row of photodetectors starting with a first photodetector 332 and also including a second photodetector 342, a third photodetector 352, a fourth photodetector 362, a fifth photodetector 372, and a sixth photodetector 382. A second row of photodetectors starts with a seventh photodetector 334 and includes an eight photodetector 344, a ninth photodetector 354, a tenth photodetector 364, an eleventh photodetector 374, and a twelfth photodetector 384. A third row of photodetectors starts with a thirteenth photodetector 336 and also includes a fourteenth photodetector 346, a fifteenth photodetector 356, a sixteenth photodetector 366, a seventeenth photodetector 376, and an eighteenth photodetector 386. A fourth row of photodetectors starts with a nineteenth photodetector 338 and also includes a twentieth photodetector 348, a twenty-first photodetector 358, a twenty-second photodetector 368, a twenty-third photodetector 378, and a twenty-fourth photodetector 388.

In the optical demultiplexing receiver 300, the dispersed light of the plurality of demultiplexed optical beams 325 may be angularly separated up by both wavelength and polarization by the at least one nanostructured layer and emitted on to the photodetector array 155 such that individual photodetectors or different groups of neighboring photodetectors may receive different portions of the incoming signal. In some embodiments, the at least one nanostructured layer may separate incoming signal by polarization relative to the vertical, or Y-axis direction of the photodetector array 155. In some embodiments, the at least one nanostructured layer may also separate the incoming signal by wavelength relative to the horizontal, or X-axis direction of the photodetector array 155. As such, photodetectors of the same row may share the same polarization. In the exemplary embodiment of FIG. 4, the first row of photodetectors starting with the first photodetector 332 may receive TE polarized light, the second row of photodetectors starting with the seventh photodetector 334 may receive TM polarized light, the third row of photodetectors starting with the thirteenth photodetector 336 may receive RCP polarized light, and the fourth row of photodetectors starting with the nineteenth photodetector 338 may receive LCP polarized light. In contrast, the first column of photodetectors starting with the first photodetector 332 may receive a first wavelength, the second column of photodetectors starting with the second photodetector 342 may receive a second wavelength, the third column of photodetectors starting with the third photodetector 352 may receive a third wavelength, the fourth column of photodetectors starting with the fourth photodetector 362 may receive a fourth wavelength, the fifth column of photodetectors starting with the fifth photodetector 372 may receive a fifth wavelength, and the sixth column of photodetectors starting with the sixth photodetector 382 may receive a sixth wavelength. As such, in some embodiments, each photodetector of the photodetector array 155 may receive a specific polarization and wavelength different from the other photodetectors of the photodetector array 155.

In some embodiments, the number of photodetectors in the photodetector array 155 may be greater than the number of demultiplexed signals. In some embodiments, the second optical fiber 137 may be a pluggable optical fiber which may be swapped during operation of the optical demultiplexing receiver 300. In some embodiments, a swap in the optical fiber may alter the location and angle of incident of the beam carrying the optical input entering the optical demultiplexer 152 and may in turn alter the alignment of the dispersed light of the plurality of demultiplexed optical beams 325. Thus, in some embodiments, the designation of each row and column of the photodetector array 155 may be defined based on an alignment signal mapping which specific photodetector or group of neighboring photodetectors are identified for a wavelength or polarization. As such, the optical demultiplexing receiver 300 may be, in some embodiments, able to swap to a new multiplexing scheme based on the transmitting fiber. In some embodiments, the alignment signal may be adjusted based on changes in temperature affecting optical components.

Figure 5:
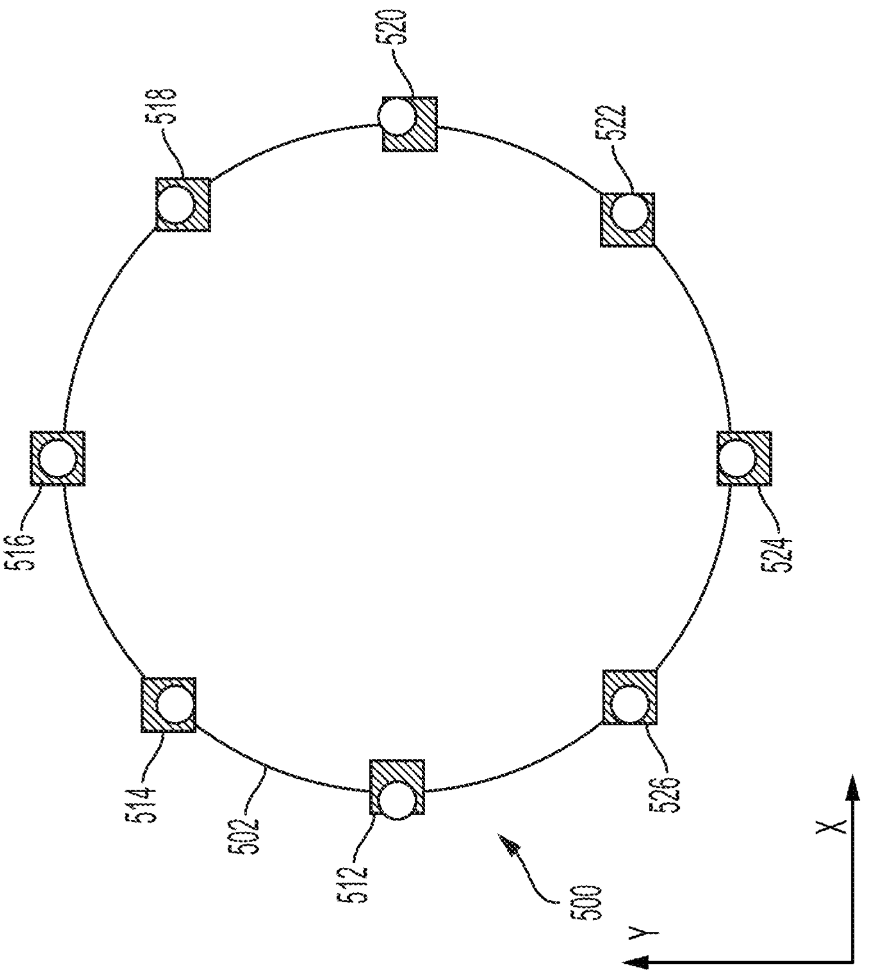
FIG. 5 depicts a plan view of an example embodiment of a circular photodetector array according to various embodiments of the subject matter disclosed herein.

FIG. 5. discloses an exemplary embodiment of a circular photodetector array 500. In some embodiments, the circular photodetector array 500 may be used as the photodetector array 155. The circular photodetector array 500 includes a substrate layer 502 which individual photodetectors are mounted upon. While shown as a circle in FIG. 5, the substrate layer 502 is not limited to a circular shape, and may be rectangular, square, or any other shape. The individual photodetectors of the circular photodetector array 500 may be mounted in a circular configuration with a first circular photodetector 512, a second circular photodetector 514, a third circular photodetector 516, a fourth circular photodetector 518, a fifth circular photodetector 520, a sixth circular photodetector 522, a seventh circular photodetector 524, and an eight circular photodetector 526. Similar to the 2-D array configuration of the photodetector array 155, the individual photodetectors may be arranged to obtain a portion of the dispersed light of the plurality of demultiplexed optical beams 325. As such, unlike the 2-D array of the photodetector array 155, which collects light along the X and Y axis, the circular photodetector array 500 may collect light along the radial and angular orientations from the common center of circular photodetector array 500. While FIG. 5 shows only photodetectors along a single radius, in some embodiments, multiple sets of photodetectors may be aligned along the same angle at different radii, such that a dispersed optical signal may be differentiated along both angle and radial orientations.

Figure 6:
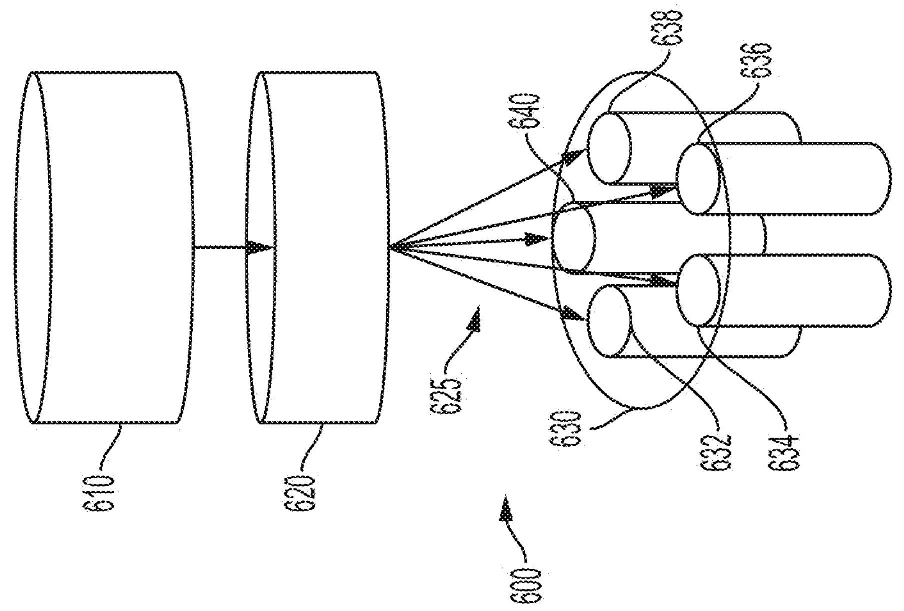
FIG. 6 depicts an exploded view of an example embodiment of an optical fiber coupler according to various embodiments of the subject matter disclosed herein.

FIG. 6 discloses an exemplary embodiment of an optical fiber coupled demultiplexer 600. The optical fiber coupled demultiplexer 600 may be used in line as part of optical fiber communications and may be separate from both an EIC or PIC. The optical fiber coupled demultiplexer 600 includes an optical fiber input 610 for receiving an input optical signal. The input optical signal may be multiplexed. The input optical signal is directed to a thin film nanostructure layer 620. The thin film nanostructure layer 620 receives the input optical signal and separates the multiplexed signal into a plurality of dispersed signals 625 by at least one of wavelength, polarization, and optical mode. The plurality of dispersed signals 625 may then be received by an output fiber connection 630. The output fiber connection 630 is shown having multiple fiber cores, including a first fiber core 632, a second fiber core 634, a third fiber core 636, a fourth fiber core 638 and a fifth fiber core 640. The multiple fiber cores may be arranged such that each fiber core is aligned to a corresponding optical beam from the plurality of dispersed signals 625. Each fiber core may then direct the signal separately.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A device comprising:

an electronic integrated circuit comprising an optical demultiplexer and at least one photodetector optically coupled to the optical demultiplexer;

the optical demultiplexer having at least one nanostructured layer, the at least one nanostructured layer receiving an incoming optical signal, the at least one nanostructured layer separates the incoming optical signal into a first separated optical signal and a second separated optical signal, and the at least one nanostructured layer divides the first separated optical signal into a first divided optical signal and a second divided optical signal; and the at least one photodetector having a first photodetector and a second photodetector, the first photodetector receiving the first divided optical signal and the second photodetector receiving the second divided optical signal.

2. The device of claim 1, wherein the at least one nanostructured layer separates the first separated optical signal and the second separated optical signal by polarization, and wherein the at least one nanostructured layer divides the first divided optical signal and the second divided optical signal by optical mode.

3. The device of claim 1, wherein the at least one nanostructured layer separates the first separated optical signal and the second separated optical signal by wavelength, and wherein the at least one nanostructured layer divides the first divided optical signal and the second divided optical signal by polarization.

4. The device of claim 1, wherein the at least one nanostructured layer separates the first separated optical signal and the second separated optical signal by optical fiber mode, and wherein the at least one nanostructured layer divides the first divided optical signal and the second divided optical signal by wavelength.

5. The device of claim 1, wherein the optical demultiplexer includes a plug connector configured to receive an optical fiber; and wherein the optical fiber transmits the incoming optical signal to the optical demultiplexer.

6. The device of claim 1, wherein the optical demultiplexer includes at least one thin film optical coating layer contacting the at least one nanostructured layer.

7. The device of claim 6, wherein the at least one thin film optical coating layer is selected from at least one of a diffractive coating, an anti-reflection coating, a polarizing coating, and a filter coating.

8. The device of claim 1, wherein at least one nanostructured layer divides the second separated optical signal into a third divided optical signal and a fourth divided optical signal;

wherein at least one nanostructured layer separates the incoming optical signal into the first separated optical signal and the second separated optical signal by polarization; and wherein at least one nanostructured layer divides the first separated optical signal and the second separated optical signal into the first divided optical signal, the second divided optical signal, the third divided optical signal, and the fourth divided optical signal by wavelength.

9. The device of claim 8, wherein a third photodiode receives the third divided optical signal and a fourth photodiode to receives the fourth divided optical signal.

10. A system comprising:

a substrate having an electronic integrated circuit and a photonic integrated circuit mounted thereon;

the photonic integrated circuit having an optical transmitter, the optical transmitter optically coupled to a first optical fiber, the optical transmitter transmitting an outgoing optical signal via the first optical fiber;

the electronic integrated circuit having an optical receiver and an optical demultiplexer, the optical receiver optically coupled to a second optical fiber having an incoming optical signal, the optical demultiplexer demultiplexing the incoming optical signal into a first optical signal and a second optical signal, and the optical demultiplexer demultiplexing the first optical signal into a third optical signal and a fourth optical signal; and the electronic integrated circuit having a first photodetector and a second photodetector, the first photodetector receiving the third optical signal, and the second photodetector receiving the fourth optical signal.

11. The system of claim 10, wherein the optical demultiplexer has a first nanostructured layer, the first nanostructured layer separating the incoming optical signal into the first optical signal and the second optical signal, and wherein the optical demultiplexer has a second nanostructured layer, the second nanostructured layer dividing the first optical signal into the third optical signal and the fourth optical signal.

12. The system of claim 10, wherein the optical transmitter includes a first plug connector configured to receive the first optical fiber; and wherein the optical receiver includes a second plug connector configured to receive the second optical fiber.

13. The system of claim 10, wherein the first optical signal has a first set of wavelengths;

wherein the second optical signal has a second set of wavelengths;

wherein the first photodetector is a first group of neighboring photodetectors;

wherein the second photodetector is a second group of neighboring photodetectors;

wherein the optical demultiplexer divides the first set of wavelengths across the first group of neighboring photodetectors; and wherein the optical demultiplexer divides the second set of wavelengths across the second group of neighboring photodetectors.

14. The system of claim 13, wherein the first group of neighboring photodetectors is a 2-D array; and wherein the second group of neighboring photodetectors is a 2-D array.

15. The system of claim 13, wherein the first group of neighboring photodetectors is a circular array; and wherein the second group of neighboring photodetectors is a circular array.

16. A device comprising:

an optical demultiplexer having a nanostructure layer, the optical demultiplexer having a first side and a second side, the second side opposite the first side;

an optical fiber input contacting the first side, the optical fiber input transmitting an optical input signal into the optical demultiplexer;

the nanostructure layer splitting the optical input signal into a first optical output signal and a second optical output signal;

the nanostructure layer dividing the first optical output signal into a third optical output signal and a fourth optical output signal;

a first optical fiber output contacting the second side, the first optical fiber output receiving the third optical output signal from the optical demultiplexer; and a second optical fiber output contacting the second side, the second optical fiber output receiving the fourth optical output signal from the optical demultiplexer.

17. The device of claim 16, wherein the nanostructure layer splits the first optical output signal and the second optical output signal by polarization, and wherein the nanostructured layer divides the third optical output signal and the fourth optical output signal by optical mode.

18. The device of claim 16, wherein the nanostructure layer splits the first optical output signal and the second optical output signal by wavelength, and wherein the nanostructured layer divides the third optical output signal and the fourth optical output signal by polarization.

19. The device of claim 16, wherein the nanostructure layer splits the first optical output signal and the second optical output signal by optical fiber mode, and wherein the nanostructured layer divides the third optical output signal and the fourth optical output signal by wavelength.

20. The device of claim 16, wherein the first side includes a first plug connector configured to receive a first optical fiber; and wherein the second side includes a second plug connector configured to receive a second optical fiber.

* * * * *